United States Patent [19]
Landmeier

[11] Patent Number: 5,274,198
[45] Date of Patent: Dec. 28, 1993

[54] PRINTED CONDUCTIVE INK ELECTROSTATIC SHIELD FOR ELECTROMAGNETIC DIGITIZERS

[75] Inventor: Waldo L. Landmeier, Phoenix, Ariz.

[73] Assignee: Cal Comp Inc., Anaheim, Calif.

[21] Appl. No.: 816,308

[22] Filed: Dec. 26, 1991

[51] Int. Cl.⁵ .................................... G08C 13/00
[52] U.S. Cl. ............................... 178/18; 178/19
[58] Field of Search ..................... 178/18, 19, 20; 340/706, 709

[56] References Cited

U.S. PATENT DOCUMENTS

| | | | |
|---|---|---|---|
| 4,587,378 | 5/1986 | Moore | 178/18 |
| 4,988,837 | 1/1991 | Murakami et al. | 178/19 |
| 5,124,509 | 6/1992 | Hoendervoogt et al. | 178/19 |

Primary Examiner—Curtis Kuntz
Assistant Examiner—Paul Loomis
Attorney, Agent, or Firm—Wm. F. Porter, Jr.; Donald A. Streck

[57] ABSTRACT

In an electromagnetic digitizer tablet having a grid of receptor wire disposed below a working surface over which a cursor emanating a magnetic field detected by the receptor wires is moved, this invention is an improvement to reduce electrostatically-caused jitters in data from the receptor wires. A grounded electrically conductive shield disposed between the grid of receptor wires and the working surface. The grounded electrically conductive shield is of a material and thickness to pass the magnetic field without substantial attenuation while conducting any electrostatic energy forming thereon to ground. Both conductive ink and a very thin metal foil can be used for the shield. The digitizer tablet is also shown embodied in the input/display device of a pen-driven computing system.

15 Claims, 2 Drawing Sheets

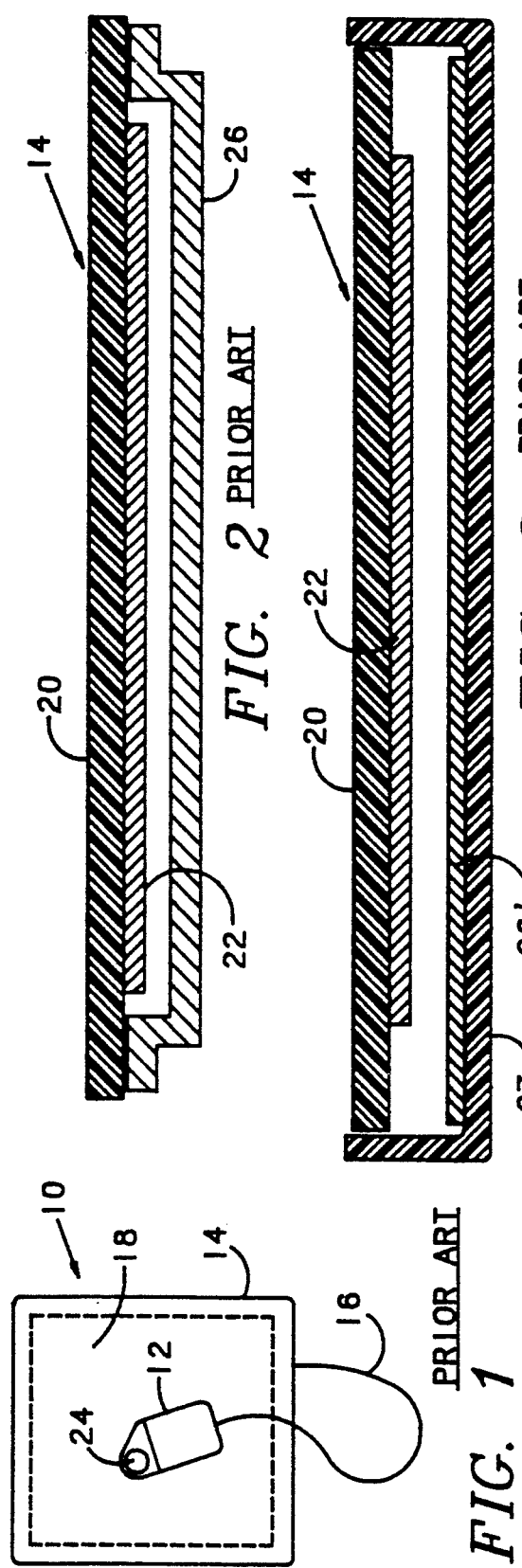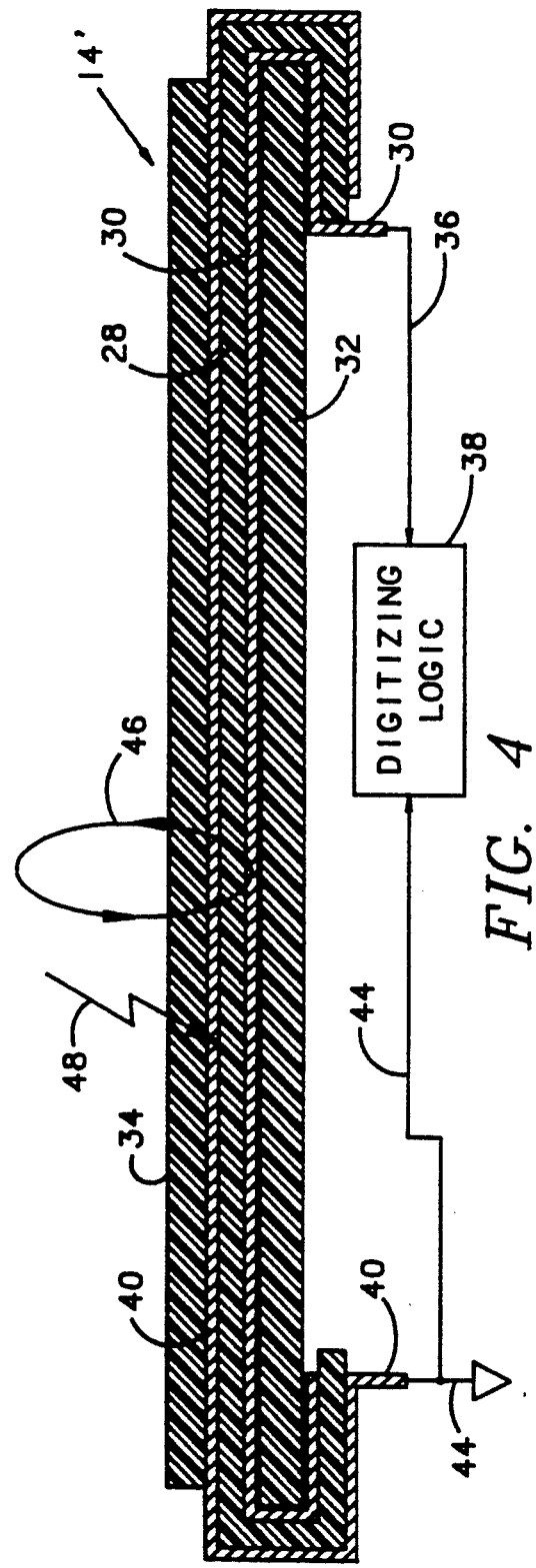

PRINTED CONDUCTIVE INK ELECTROSTATIC SHIELD FOR ELECTROMAGNETIC DIGITIZERS

BACKGROUND OF THE INVENTION

This invention relates to digitizer systems and, more particularly, in an electromagnetic digitizer tablet having a grid of receptor wires disposed below a working surface over which a cursor emanating a magnetic field detected by the receptor wires is moved, to the improvement to reduce electrostatically-caused jitters in data from the receptor wires comprising a grounded electrically conductive shield disposed between the grid of receptor wires and the working surface, the grounded electrically conductive shield being of a material and thickness to pass the magnetic field without substantial attenuation while conducting any electrostatic energy forming thereon to ground. It also relates to digitizers as employed as part of the input/display device of a pen-driven computing system.

In a digitizer system such as that indicated as 10 in FIG. 1, a cursor 12 connected to a tablet 14 by a connecting cable 16 is moved over a working surface 18 of the tablet 14 in order to input positional data to a computer (not shown) connected to the tablet 14. As shown in the cutaway drawing of FIG. 2, the tablet 14 typically comprises a plastic upper surface 20 carrying a grid of electrical conductors 22 which interact with a coil 24 within the cursor 12 to provide the positional information required. In such systems, it is quite typical to provide a metallic shield 26 of aluminum, or the like, over the grid of conductors 22. The shield 26 acts to magnetically shunt and concentrate electromagnetic radiation from the coil 24 thereby eliminating problems of stray fields interacting with undesired wires at the peripheral edges of the grid of conductors 22 in particular. Where the tablet 14 is mounted in a case 27 as depicted in FIG. 3, the metallic shield 26' may be attached to the bottom of the case 27 as with adhesive or the like.

While earlier digitizing systems 10, such as those of FIGS. 1, 2, and 3 employed printed circuit boards with the grid of conductors 22 formed thereon either as conductors according to printed circuit techniques or as actual wires physically connected to the circuitry of the printed circuit board, more recently the grid of conductors 22 has been formed on a sheet of mylar, or the like, employing silk-screening techniques with conductive inks. The mylar substrate containing the printed grid of conductors 22 is then wrapped over and around the edges of a supporting piece of insulating material such as a printed circuit board, which may or may not contain additional components and logic associated with the digitizer system.

When a digitizer tablet constructed according to such techniques is placed close adjacent a computer terminal, electrostatic radiation from the terminal may cause data jitters in the electromagnetic digitizer. In such construction, the use of a metal shield 26, as in FIG. 2, is not practical and would not solve the particular problem as it is functionally positioned to shunt a portion of electromagnetic waves and not to pass electromagnetic waves and shunt electrostatic radiation as is necessary to solve the problem addressed by the present invention. This is particularly true in larger-sized digitizer tablets employed with larger drawings, and the like. A large metal shield associated with the tablet is impractical and unsuitable for solving the problem on the one hand and, even if it could solve the electrostatic radiation problem, would be cost-prohibitive on the other hand. Electrostatic interference is also a problem with so-called pen-driven computing systems where a digitizing tablet is associated with a back-lit liquid crystal display panel wherein both the liquid crystal display panel and the backlighting panel behind it emit electrostatic energy.

Wherefore, it is an object of the present invention to provide a method and apparatus for shielding conductive ink flexible digitizer tablets from the effects of electrostatic radiation while not interfering with required electromagnetic fields.

It is another object of the present invention to provide a method and apparatus for shielding conductive ink flexible digitizer tablets associated with back-lit liquid crystal display panels in pen-driven computing systems from the electrostatic radiations of the liquid crystal display panel and the backlighting panel behind it.

Other objects and benefits of the invention will become apparent from the detailed description which follows hereinafter when taken in conjunction with the drawing figures which accompany it.

SUMMARY

The foregoing objects have been attained in an electromagnetic digitizer tablet system wherein a cursor emanating a magnetic field is moved over a working surface of a tablet having a grid of receptor wires disposed under the working surface and the magnetic field is detected by the receptor wires, by the improved tablet of the present invention for reducing electrostatically-caused jitters in data from the receptor wires comprising, an insulating substrate having the grid of receptor wires disposed on one side thereof as conductive ink; and, a grounded electrically conductive shield disposed on an opposite side of the insulating substrate between the grid of receptor wires and a working surface of the tablet, the grounded electrically conductive shield being of a material and thickness to pass the magnetic field without substantial attenuation while conducting any electrostatic energy forming thereon to ground.

In one embodiment, the grounded electrically conductive shield comprises a layer of conductive ink disposed on the opposite side of the insulating substrte.

In another embodiment, the grounded electrically conductive shield comprises a thin metal foil disposed on the opposite side of the insulating substrate.

In an input/display device for a pen-driven computing system including a liquid crystal display (LCD) panel forming a working surface with a backlighting panel behind a back surface of the LCD panel and an electromagnetic digitizer tablet having a grid of receptor wires disposed below the working surface over which a cursor emanating a magnetic field detected by the receptor wires is moved, the improvement of the present invention to reduce electrostatically-caused jitters in data from the receptor wires comprises a grounded electrically conductive shield disposed between the grid of receptor wires and the working surface, the grounded electrically conductive shield being of a material and thickness to pass the magnetic field without substantial attenuation while conducting any electrostatic energy forming thereon to ground.

Preferably in such an implementation, the grid of receptor wires is disposed behind the backlighting panel and the grounded electrically conductive shield is disposed between the backlighting panel and the grid of receptor wires. The grounded electrically conductive shield may be carried by a back surface of the backlighting panel.

DESCRIPTION OF THE DRAWINGS

FIG. 1 is a simplified drawing of a prior art digitizer system comprising a cursor and tablet.

FIG. 2 is a simplified cutaway drawing through a typical prior art digitizer tablet wherein a metal shield is placed over the grid of conductors therein to eliminate certain edge effects, and the like, by shunting a portion of the electromagnetic fields employed in the position-determining process.

FIG. 3 is a simplified cutaway drawing through a typical prior art digitizer tablet mounted in a plastic case wherein a metal shield such as that of FIG. 2 is attached to the case.

FIG. 4 is a simplified cross-section through a digitizer tablet according to the present invention wherein electromagnetic fields are passed without attenuation or shunting and electromagnetic radiation is conducted away to ground.

DESCRIPTION OF THE PREFERRED EMBODIMENT

Figure 5:
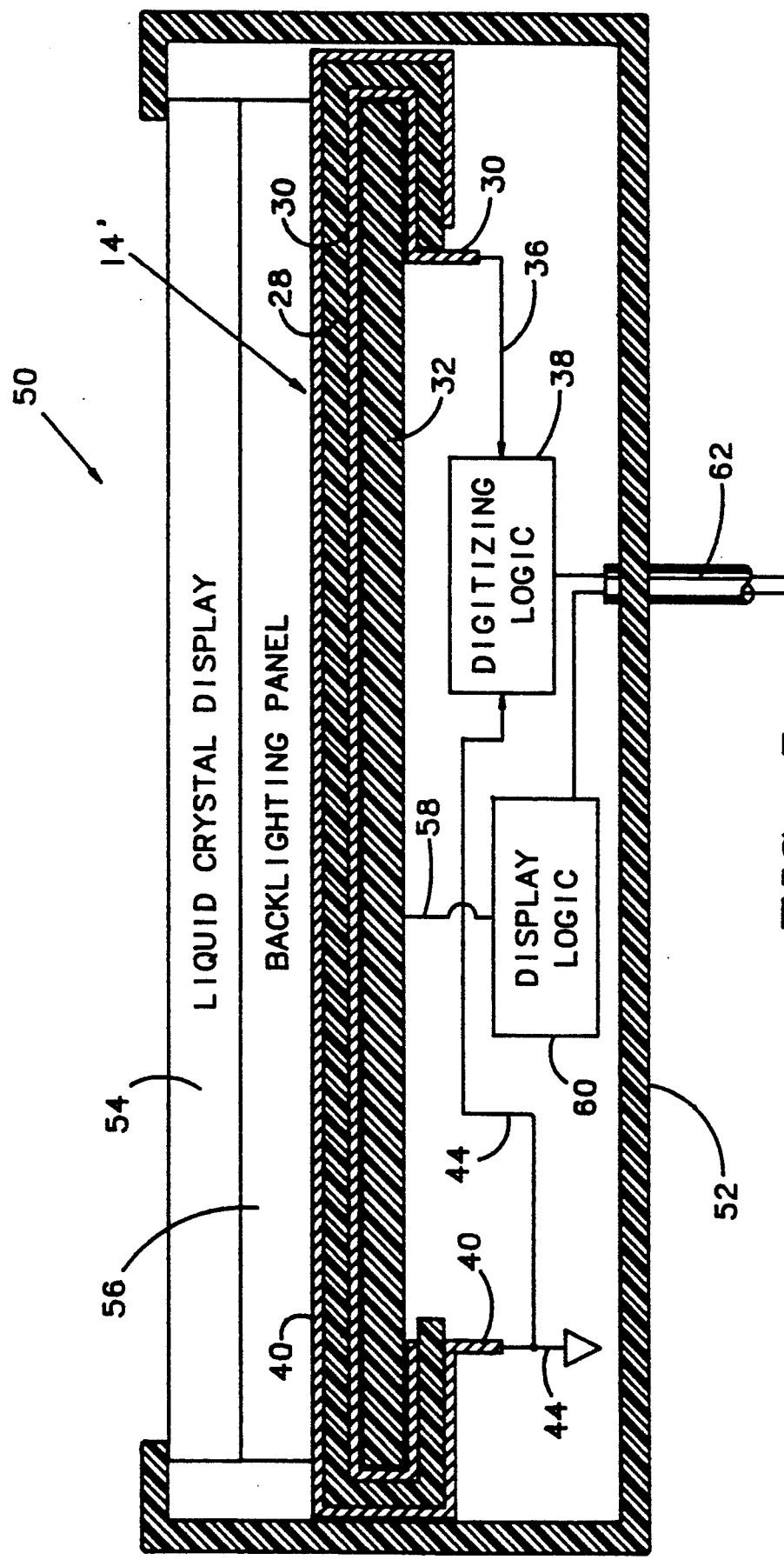
FIG. 5 is a simplified cross-section through a digitizer tablet according to the present invention as employed in association with a liquid crystal display for use in pen-driven computing applications.

The construction of a digitizing tablet 14' according to the present invention is shown in FIG. 4 in simplified cross-section. The mylar substrate 28 has the conductive grid ink 30 comprising a grid of the tablet 14' applied to a bottom surface thereof. The mylar substrate 28 is wrapped over and around the edges of a supporting substrate 32 comprised of a printed circuit board material, or the like, as shown. The ink 30 of the grid is, therefore, protected between the supporting substrate 32 and the mylar substrate 28. Typically, a thin overlayer 34 of a tough plastic material is placed over the mylar substrate 28 to protect it from the continued rubbing action of the cursor 12 thereover. The ink 30 is electrically connected by the wire 36 to the digitizing logic 38. The digitizing logic 38 may be contained on the printed circuit board comprising the supporting substrate 32, if desired. To provide the shielding of the present invention, a printed conductive ink shield 40 is applied to the opposite side of the mylar substrate 28 from the ink 30. The printed conductive ink shield is further grounded as at 42 and connected as by wire 44 to the digitizing logic 38. In tested embodiments of the tablet 14' of FIG. 4, it was found that virtually all radiated electrostatic energy can be eliminated as a source of noise by the shielding with no reduction of the electromagnetic field required for accurate sensing. Thus, the conductive ink shield 40 passes the electromagnetic radiation 46 from the cursor 12 through to the receiving grid of ink 30 (without shunting it as in the case of the metal shield 26 of FIG. 2) while effectively conducting away any electrostatic energy 48 to ground to prevent the undersired jitter noise produced by such electrostatic energy buildup.

While the use of a conductive ink is preferred for the electrostatic shield 40 because of its ease of application and low additional cost in a manufacturing process wherein other conductive areas are being applied with conductive inks, other materials could be employed for the shield within the scope and spirit of the present invention. For example, a grounded thin metal foil could be applied between the working surface and the detecting grid. The only limitation would be that, as opposed to other implementations where a foil is used as a shield such as the shield 26 of FIG. 2 where shunting of electromagnetic fields is desired and, therefore, the foil must be greater than a threshold thickness, if a foil were to be employed to implement the present invention, it should be less than such threshold thickness so that the electromagnetic fields pass therethrough with virtually no shunting or attenuation. In this regard, the "foil" could be a very thin layer of metal applied in place such as with a disposition or similar process as known to those skilled in the art.

Turning now to FIG. 5, the present invention is shown as incorporated into a pen-driven computing input/display device 50. The pen-driven computing input/display device 50 comprises a case 52 having a liquid crystal display (LCD) panel 54 at the top thereof. Behind the LCD panel 54 is a backlighting panel 56. Behind the backlighting panel 56 is a digitizing tablet 14' according to the present invention substantially as previously described in detail with respect to FIG. 4. The LCD panel 54 and backlighting panel 56 are connected by wires 58 to appropriate display logic 60. The display logic 60 and digitizing logic 38 are connected by a connecting cable 62 to the pen-driven computer (not shown). As those skilled in the art will readily recognize and appreciate, if desired the supporting substrate 32 could be eliminated by adhesively attaching the tablet 14' to the back of the backlighting panel 56. In such case, the resultant structure of the pen-driven computing input/display device 50 would be quite thin, as is a primary design goal of such devices. Not being necessary in this embodiment, the overlayer 34 of the table 14' of FIG. 4 is also omitted. Also, in such an embodiment, the electrostatic shield 40 could, of course, be applied to the back surface of the backlighting panel 56, if desired, to achieve the same benefits. The use of an adhesively-back metal foil on the back surface of the backlighting panel 56 would be particularly applicable in such an embodiment.

Wherefore, having thus described the present invention, what is claimed is:

1. In an electromagnetic digitizer tablet having a grid of receptor wires disposed below a working surface over which a cursor emanating a magnetic field detected by the receptor wires is moved, the improvement to reduce electrostatically-caused jitters in data from the receptor wires comprising:

a grounded electrically conductive shield disposed between the grid of receptor wires and the working surface, said grounded electrically conductive shield being of a material and thickness to pass the magnetic field without substantial attenuation while conducting any electrostatic energy forming thereon to ground.

2. The improvement to an electromagnetic digitizer tablet of claim 1 wherein:

said grounded electrically conductive shield comprises a layer of conductive ink disposed between the grid of receptor wires and the working surface.

3. The improvement to an electromagnetic digitizer tablet of claim 2 wherein:

a) the grid of receptor wires comprises conductive ink disposed on one side of an insulating substrate; and, b) said layer of conductive ink comprising said grounded electrically conductive shield is disposed on an opposite side of said insulating substrate.

4. The improvement to an electromagnetic digitizer tablet of claim 1 wherein:

said grounded electrically conductive shield comprises a thin metal foil disposed between the grid of receptor wires and the working surface.

5. In an electromagnetic digitizer tablet system wherein a cursor emanating a magnetic field is moved over a working surface of a tablet having a grid of receptor wires disposed under the working surface and the magnetic field is detected by the receptor wires, the improved tablet for reducing electrostatically-caused jitters in data from the receptor wires comprising:

a) an insulating substrate having the grid of receptor wires disposed on one side thereof as conductive ink; and, b) a grounded electrically conductive shield disposed on an opposite side of said insulating substrate between the grid of receptor wires and a working surface of the tablet, said grounded electrically conductive shield being of a material and thickness to pass the magnetic field without substantial attenuation while conducting any electrostatic energy forming thereon to ground.

6. The improved tablet for an electromagnetic digitizer tablet of claim 5 wherein:

said grounded electrically conductive shield comprises a layer of conductive ink disposed on said opposite side of said insulating substrate.

7. The improved tablet for an electromagnetic digitizer tablet of claim 5 wherein:

said grounded electrically conductive shield comprises a thin metal foil disposed on said opposite side of said insulating substrate.

8. In an electromagnetic digitizer tablet system wherein a cursor emanating a magnetic field is moved over a working surface of a tablet having a grid of receptor wires disposed under the working surface and the magnetic field is detected by the receptor wires, the improved tablet for reducing electrostatically-caused jitters in data from the receptor wires comprising:

a) a flexible insulating substrate having the grid of receptor wires disposed on one side thereof as conductive ink;

b) an electrically conductive shield disposed on an opposite side of said flexible insulating substrate as conductive ink;

c) means for grounding said electrically conductive shield; and, d) means for supporting said flexible insulating substrate whereby the magnetic field is passed through said electrically conductive shield without substantial attenuation while any electrostatic energy is conducted to ground by said electrically conductive shield.

9. In an electromagnetic digitizer tablet system wherein a cursor emanating a magnetic field is moved over a working surface of a tablet having a grid of receptor wires disposed under the working surface and the magnetic field is detected by the receptor wires, the improved tablet for reducing electrostatically-caused jitters in data from the receptor wires comprising:

a) a flexible insulating substrate having the grid of receptor wires disposed on one side thereof as conductive ink;

b) an electrically conductive shield disposed on an opposite side of said flexible insulating substrate, said electrically conductive shield comprising a metal foil thin enough to pass the magnetic field therethrough without substantial attenuation while electrically conducting any electrostatic energy forming thereon;

c) means for grounding said electrically conductive shield; and, d) means for supporting said flexible insulating substrate whereby the magnetic field is passed through said metal foil of said electrically conductive shield without substantial attenuation while any electrostatic energy is conducted to ground by said metal foil of said electrically conductive shield.

10. In an input/display device for a pen-driven computing system including a liquid crystal display (LCD) panel with a backlighting panel behind a back surface of the LCD panel and an electromagnetic digitizer tablet system associated with the LCD panel wherein a cursor emanating a magnetic field is moved over a working surface of a tablet disposed behind the backlighting panel and wherein the tablet has a grid of receptor wires disposed under the working surface and the magnetic field is detected by the receptor wires, the improved tablet for reducing electrostatic interference from the LCD panel and the backlighting panel with data from the receptor wires comprising:

a) a flexible insulating substrate having the grid of receptor wires disposed on one side thereof as conductive ink;

b) an electrically conductive shield disposed on an opposite side of said flexible insulating substrate as conductive ink;

c) means for grounding said electrically conductive shield; and, d) means for supporting said flexible insulating substrate behind the backlighting panel whereby the magnetic field is passed through said electrically conductive shield without substantial attenuation while any electrostatic energy is conducted to ground by said electrically conductive shield.

11. In an input/display device for a pen-driven computing system including a liquid crystal display (LCD) panel with a backlighting panel behind a back surface of the LCD panel and an electromagnetic digitizer tablet system associated with the LCD panel wherein a cursor emanating a magnetic field is moved over a working surface of a tablet disposed behind the backlighting panel and wherein the tablet has a grid of receptor wires disposed under the working surface and the magnetic field is detected by the receptor wires, the improved tablet for reducing electrostatic interference from the LCD panel and the backlighting panel with data from the receptor wires comprising:

a) a flexible insulating substrate having the grid of receptor wires disposed on one side thereof;

b) an electrically conductive shield disposed on an opposite side of said flexible insulating substrate;

c) means for grounding said electrically conductive shield; and, d) means for supporting said flexible insulating substrate behind the backlighting panel whereby the magnetic field is passed through said electrically conductive shield without substantial attenuation while any electrostatic energy is conducted to ground by said electrically conductive shield.

12. The improved tablet for an input/display device of a pen-driven computing system of claim 11 wherein:
said grid of receptor wires and said electrically conductive shield are composed of a conductive ink.

13. In an input/display device for a pen-driven computing system including a liquid crystal display (LCD) panel forming a working surface with a backlighting panel behind a back surface of the LCD panel and an electromagnetic digitizer tablet having a grid of receptor wires disposed below the working surface over which a cursor emanating a magnetic field detected by the receptor wires is moved, the improvement to reduce electrostatically-caused jitters in data from the receptor wires comprising:
a grounded electrically conductive shield disposed between the grid of receptor wires and the working surface, said grounded electrically conductive shield being of a material and thickness to pass the magnetic field without substantial attenuation while conducting any electrostatic energy forming thereon to ground.

14. The improvement to an input/display device for a pen-driven computing system of claim 13 wherein:
a) the grid of receptor wires is disposed behind the backlighting panel; and,
b) said grounded electrically conductive shield is disposed between the backlighting panel and the grid of receptor wires.

15. The improvement to an input/display device for a pen-driven computing system of claim 14 wherein:
said grounded electrically conductive shield is carried by a back surface of the backlighting panel.

* * * * *